United States Patent
Kamen et al.

(10) Patent No.: US 6,779,621 B2
(45) Date of Patent: Aug. 24, 2004

(54) RIDERLESS STABILIZATION OF A BALANCING TRANSPORTER

(75) Inventors: Dean L. Kamen, Bedford, NH (US); J. Douglas Field, Bedford, NH (US); John B. Morrell, Bedford, NH (US)

(73) Assignee: Deka Products Limited Partnership, Manchester, NH (US)

( * ) Notice: Subject to any disclaimer, the term of this patent is extended or adjusted under 35 U.S.C. 154(b) by 0 days.

(21) Appl. No.: 10/461,720

(22) Filed: Jun. 13, 2003

(65) Prior Publication Data

US 2003/0205419 A1 Nov. 6, 2003

Related U.S. Application Data (63) Continuation-in-part of application No. 09/325,976, filed on Jun. 4, 1999, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,693, filed on May 27, 1994, now Pat. No. 5,701,965, which is a continuation-in-part of application No. 08/021,789, filed on Feb. 24, 1993, now abandoned.

(60) Provisional application No. 60/389,136, filed on Jun. 14, 2002.

(51) Int. Cl.$^7$ ............................................... B60K 28/14
(52) U.S. Cl. .................... 180/282; 180/218; 280/5.513
(58) Field of Search ................................ 180/170, 171, 180/7.1, 21, 218, 271, 65.1–65.3, 282, 338, 41; 280/5.513, 5.507

(56) References Cited

U.S. PATENT DOCUMENTS

| | | | |
|---|---|---|---|
| 584,127 A | 6/1897 | Draullette et al. | |
| 849,270 A | 4/1907 | Schafer et al. | |
| 2,742,973 A | 4/1956 | Johannesen | |
| 3,145,797 A | 8/1964 | Taylor | |
| 3,260,324 A | 7/1966 | Suarez | |
| 3,283,398 A | 11/1966 | Andren | |

(List continued on next page.)

FOREIGN PATENT DOCUMENTS

| | | |
|---|---|---|
| DE | 2 048 593 | 5/1971 |
| DE | 31 28 112 A1 | 2/1983 |

(List continued on next page.)

OTHER PUBLICATIONS

Kawaji, S., *Stabilization of Unicycle Using Spinning Motion, Denki Gakkai Ronbushi, D*, vol. 107, Issue 1, Japan (1987). pp. 21–28.

(List continued on next page.)

*Primary Examiner*—Lesley D. Morris
*Assistant Examiner*—Matthew Luby
(74) *Attorney, Agent, or Firm*—Bromberg & Sunstein LLP (57) ABSTRACT

A method for stabilizing a balancing transporter under riderless conditions. The balancing transporter is characterized by a center of mass, and has two laterally disposed wheels and a region of contact with an underlying surface. In accordance with the method, the absence of a user aboard the transporter is first detected. Then a desired transporter pitch is determined such as to establish a condition of stasis wherein the center of mass is disposed directly above the region of contact between the balancing transporter and the underlying surface. Finally, a torque is applied to the laterally disposed wheels so as to maintain the transporter at the desired transporter pitch. The torque may include coadded terms where the terms are, respectively, proportional to a pitch error, a pitch rate, a wheel rate, and an integral representing the wheel rotation that was required to bring the transporter to the condition of stasis.

4 Claims, 5 Drawing Sheets

U.S. PATENT DOCUMENTS

| | | |
|---|---|---|
| 3,288,234 A | 11/1966 | Feliz |
| 3,348,518 A | 10/1967 | Forsyth et al. |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst, Jr. |
| 3,860,264 A | 1/1975 | Douglas et al. |
| 3,872,945 A | 3/1975 | Hickman et al. |
| 3,952,822 A | 4/1976 | Udden et al. |
| 4,018,440 A | 4/1977 | Deutsch |
| 4,062,558 A | 12/1977 | Wasserman |
| 4,076,270 A | 2/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,151,892 A | 5/1979 | Francken |
| 4,222,449 A | 9/1980 | Feliz |
| 4,264,082 A | 4/1981 | Fouchey, Jr. |
| 4,266,627 A | 5/1981 | Lauber |
| 4,293,052 A | 10/1981 | Daswick et al. |
| 4,325,565 A | 4/1982 | Winchell |
| 4,354,569 A | 10/1982 | Eichholz |
| 4,363,493 A | 12/1982 | Veneklasen |
| 4,373,600 A | 2/1983 | Buschbom et al. |
| 4,375,840 A | 3/1983 | Campbell |
| 4,510,956 A | 4/1985 | King |
| 4,560,022 A | 12/1985 | Kassai |
| 4,566,707 A | 1/1986 | Nitzberg |
| 4,570,078 A | 2/1986 | Yashima et al. |
| 4,571,844 A | 2/1986 | Komasaku et al. |
| 4,624,469 A | 11/1986 | Bourne, Jr. |
| 4,657,272 A | 4/1987 | Davenport |
| 4,685,693 A | 8/1987 | Vadjunec |
| 4,709,772 A | 12/1987 | Brunet |
| 4,716,980 A | 1/1988 | Butler |
| 4,740,001 A | 4/1988 | Torleumke |
| 4,746,132 A | 5/1988 | Eagan |
| 4,770,410 A | 9/1988 | Brown |
| 4,786,069 A | 11/1988 | Tang |
| 4,790,400 A | 12/1988 | Sheeter |
| 4,790,548 A | 12/1988 | Decelles et al. |
| 4,794,999 A | 1/1989 | Hester |
| 4,798,255 A | 1/1989 | Wu |
| 4,802,542 A | 2/1989 | Houston et al. |
| 4,809,804 A | 3/1989 | Houston et al. |
| 4,834,200 A | 5/1989 | Kajita |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,919,225 A | 4/1990 | Sturges |
| 4,953,851 A | 9/1990 | Sherlock et al. |
| 4,984,754 A | 1/1991 | Yarrington |
| 4,985,947 A | 1/1991 | Ethridge |
| 4,998,596 A | 3/1991 | Miksitz |
| 5,002,295 A | 3/1991 | Lin |
| 5,011,171 A | 4/1991 | Cook |
| 5,052,237 A | 10/1991 | Reimann |
| 5,111,899 A | 5/1992 | Reimann |
| 5,143,386 A * | 9/1992 | Uriarte ............ 180/41 |
| 5,158,493 A | 10/1992 | Morgrey |
| 5,161,820 A | 11/1992 | Vollmer |
| 5,168,947 A | 12/1992 | Rodenborn |
| 5,171,173 A | 12/1992 | Henderson et al. |
| 5,186,270 A | 2/1993 | West |
| 5,221,883 A | 6/1993 | Takenaka et al. |
| 5,241,875 A | 9/1993 | Kochanneck |
| 5,248,007 A | 9/1993 | Watkins et al. |
| 5,314,034 A | 5/1994 | Chittal |
| 5,350,033 A | 9/1994 | Kraft |
| 5,366,036 A | 11/1994 | Perry |
| 5,376,868 A | 12/1994 | Toyoda et al. |
| 5,419,624 A | 5/1995 | Adler et al. |
| 5,701,965 A | 12/1997 | Kamen et al. |
| 5,701,968 A | 12/1997 | Wright-Ott et al. |
| 5,775,452 A | 7/1998 | Patmont |
| 5,791,425 A | 8/1998 | Kamen et al. |
| 5,794,730 A | 8/1998 | Kamen |
| 5,971,091 A | 10/1999 | Kamen et al. |
| 5,973,463 A | 10/1999 | Okuda et al. |
| 5,975,225 A | 11/1999 | Kamen et al. |
| 5,986,221 A | 11/1999 | Stanley |
| 6,003,624 A | 12/1999 | Jorgensen et al. |
| 6,039,142 A | 3/2000 | Eckstein et al. |
| 6,050,357 A | 4/2000 | Staelin et al. |
| 6,059,062 A | 5/2000 | Staelin et al. |
| 6,125,957 A | 10/2000 | Kauffmann |
| 6,131,057 A | 10/2000 | Tamaki et al. |
| 6,223,104 B1 | 4/2001 | Kamen et al. |
| 6,225,977 B1 | 5/2001 | Li |
| 6,288,505 B1 | 9/2001 | Heinzmann et al. |
| 6,302,230 B1 | 10/2001 | Kamen et al. |
| 2002/0063006 A1 | 5/2002 | Kamen et al. |

FOREIGN PATENT DOCUMENTS

| | | |
|---|---|---|
| DE | 32 42 880 A1 | 6/1983 |
| DE | 3411489 A1 | 10/1984 |
| DE | 44 04 594 A 1 | 8/1995 |
| DE | 196 25 498 C 1 | 11/1997 |
| DE | 298 08 091 U1 | 10/1998 |
| DE | 298 08 096 U1 | 10/1998 |
| EP | 0 109 927 | 7/1984 |
| EP | 0 193 473 | 9/1986 |
| EP | 0 537 698 A1 | 4/1993 |
| EP | 0663 313 A1 | 7/1995 |
| EP | 0 958 978 A2 | 11/1999 |
| FR | 980 237 | 5/1951 |
| FR | 82 04314 | 9/1982 |
| GB | 152664 | 2/1922 |
| GB | 1213930 | 11/1970 |
| GB | 2 139 576 A | 11/1984 |
| JP | 52-44933 | 10/1975 |
| JP | 57-87766 | 6/1982 |
| JP | 57-110569 | 7/1982 |
| JP | 59-73372 | 4/1984 |
| JP | 62-12810 | 7/1985 |
| JP | 0255580 | 12/1985 |
| JP | 61-31685 | 2/1986 |
| JP | 63-305082 | 12/1988 |
| JP | 2-190277 | 7/1990 |
| JP | 4-201793 | 7/1992 |
| JP | 6-171562 | 12/1992 |
| JP | 5-213240 | 8/1993 |
| JP | 6-105415 | 12/1994 |
| JP | 7255780 | 3/1995 |
| WO | WO 86/05752 | 10/1986 |
| WO | WO 89/06117 | 7/1989 |
| WO | WO 96/23478 | 8/1996 |
| WO | WO 98/46474 | 10/1998 |
| WO | WO 00 75001 A | 12/2000 |

OTHER PUBLICATIONS

Schoonwinkel, A., *Design and Test of a Computer–Stabilized Unicycle*, Stanford University (1988), UMI Dissertation Services.

Vos, D., *Dynamics and Nonlinear Adaptive Control of an Autonomous Unicycle*, Massachusetts Institute of Technology, 1989.

Vos, D., *Nonlinear Control of an Autonomous Unicycle Robot: Practical Isues*, Massachusetts Institute of Technology, 1992.

Koyanagi et al., *A Wheeled Inverse Pendulum Type Self-Contained Mobile Robot and its Posture Control and Vehicle Control, The Society of Instrument and Control Engineers*, Special issue of the 31$^{st}$ SICE Annual Conference, Japan 1992, pp. 13–16.

Koyanagi et al., *A Wheeled Inverse Pendulum Type Self-Contained Mobile Robot, The Society of Instrument and Control Engineers*, Special issue of the 31$^{st}$ SICE Annual Conference, Japan 1992, pp. 51–56.

Koyanagi et al., *A Wheeled Inverse Pendulum Type Self-Contained Mobile Robot and its Two Dimensional Trajectory Control, Proceeding of the Second International Symposium on Measurement and Control in Robotics*, Japan 1992, pp. 891–898.

Watson Industries, Inc., Vertical Reference Manual ADS–C132–1A, 1992, pp. 3–4.

News article *Amazing Wheelchair Goes Up and Down Stairs*.

Osaka et al., *Stabilization of Unicycle, Systems and Control*, vol. 25, No. 3, Japan 1981, pp. 159–166 (Abstract Only).

Roy et al., *Five–Wheel Unicycle System, Medical & Biological Engineering & Computing*, vol. 23, No. 6, United Kingdom 1985, pp. 593–596.

Kawaji, S., *Stabilization of Unicycle Using Spinning Motion, Denki Gakkai Ronbushi, D*, vol. 107, Issue 1, Japan 1987, pp. 21–28 (Abstract Only).

Schoonwinkel, A., *Design and Test of a Computer–Stabilized Unicycle, Dissertation Abstracts International*, vol. 49/03–B, Stanford University 1988, pp. 890–1294 (Abstract only).

Vos et al., *Dynamics and Nonlinear Adaptive Control of an Autonomous Unicycle—Theory and Experiment, American Institute of Aeronautics and Astronautics*, A90–26772 10–39, Washington, D.C. 1990, pp. 487–494 (Abstract only).

Tecknico's Home Page, *Those Amazing Flying Machines*, http://www.swiftsite.com/technico.

*Stew's Hovercraft Page*, http://www.stewcam.com/hovercraft.html.

Kanoh, *Adaptive Control of Inverted Pendulum, Computrol*, vol. 2, (1983), pp. 69–75.

Yamafuji, *A Proposal for Modular–Structured Mobile Robots for Work that Principally Involve a Vehicle with Two Parallel Wheels, Automation Technology*, vol. 20, pp. 113–118 (1988).

Yamafuji & Kawamura, *Study of Postural and Driving Control of Coaxial Bicycle, Paper Read at Meeting of Japan Society of Mechanical Engineering(Series C)*, vol. 54, No. 501, (May, 1988), pp. 1114–1121.

Yamaafuji et al., *Synchronous Steering Control of a Parallel Bicycle, Paper Read at Meeting of Japan Society of Mechanical Engineering(Series C)*, vol. 55, No. 513, (May, 1989), pp. 1229–1234.

Momoi & Yamafuji, *Motion Control of the Parallel Bicycle–Type Mobile Robot Composed of a Triple Inverted Pendulum, Paper Read at Meeting of Japan Society of Mechanical Engineering(Series C)*, vol. 57, No. 541, (Sep., 1991), pp. 154–159.

* cited by examiner

RIDERLESS STABILIZATION OF A BALANCING TRANSPORTER

The present application is a continuation-in-part of copending U.S. application Ser. No. 09/325,976, filed Jun. 4, 1999, which is a continuation in part of U.S. application Ser. No. 08/479,901, filed Jun. 7, 1995, now issued as U.S. Pat. No. 5,975,225, which is a continuation in part of U.S. application Ser. No. 08/384,705, filed Feb. 3, 1995, now issued as U.S. Pat. No. 5,971,091, which is a continuation in part of U.S. application Ser. No. 08/250,693, filed May 27, 1994, now issued as U.S. Pat. No. 5,701,965, which in turn is a continuation in part of U.S. application Ser. No. 08/021,789, filed Feb. 24, 1993, now abandoned, from which the present application claims priority, all of which applications are incorporated herein by reference. The present application also claims priority from U.S. Provisional Application No. 60/389,136, filed Jun. 14, 2002.

TECHNICAL FIELD

The present invention pertains to dynamically stabilized transporters and methods for maintaining such transporters under conditions of active balance while not in operation by a user.

BACKGROUND ART

A wide range of vehicles and methods are known for transporting human subjects. Typically, such vehicles rely upon static stability, being designed so as to be stable under all foreseen conditions of placement of their ground-contacting members. Thus, for example, the gravity vector acting on the center of gravity of an automobile passes between the points of ground contact of the automobile's wheels, the suspension keeping all wheels on the ground at all times, and the automobile is thus stable. Another example of a statically stable vehicle is the stair-climbing vehicle described in U.S. Pat. No. 4,790,548 (Decelles et al.). A statically stable vehicle will typically remain in the position in which it is parked, subject, perhaps, to the requirement that a parking brake be set to prevent inadvertent rolling down an incline. Motion may then be resumed by mounting the vehicle and beginning locomotion from the self-same position of repose in which the vehicle was parked.

However, instead of being statically stable, a human transporter may lack inherent stability unless actively and dynamically stabilized. Such a transporter is described, for example, in U.S. Pat. No. 5,971,091 (Kamen et al., issued Oct. 26, 1999), which is incorporated herein by reference. If a rider dismounts from such a transporter and ceases to control its motion by leaning, the transporter may fall, and, depending upon the control algorithm implemented thereupon, may run away in an effort to maintain balance, or otherwise behave erratically. Such behavior is clearly undesirable.

SUMMARY OF THE INVENTION

In accordance with preferred embodiments of the present invention, a method is provided for maintaining stability of a riderless balancing transporter having two laterally disposed wheels. The balancing transporter has a region of contact with an underlying surface and is characterized by a center of mass. The method has a first step where the absence of a user aboard the balancing transporter is detected. Next, a desired transporter pitch is determined such as to establish the center of mass directly above the region of contact between the balancing transporter and the underlying surface. Then, a torque is applied to the laterally disposed wheels so as to maintain the transporter at the desired transporter pitch.

The step of applying torque to the laterally disposed wheels may include applying a torque proportional to the difference between a present transporter pitch and the target transporter pitch. It may also include applying a torque proportional to the sum of coadded terms, a first term proportional to the difference between a present transporter pitch and the target transporter pitch and a second term proportional to the pitch rate of the transporter. Two additional terms may also be coadded to obtain a motor torque command signal: one proportional to the wheel rotational velocity and a second to a time integral of the wheel rotational velocity.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
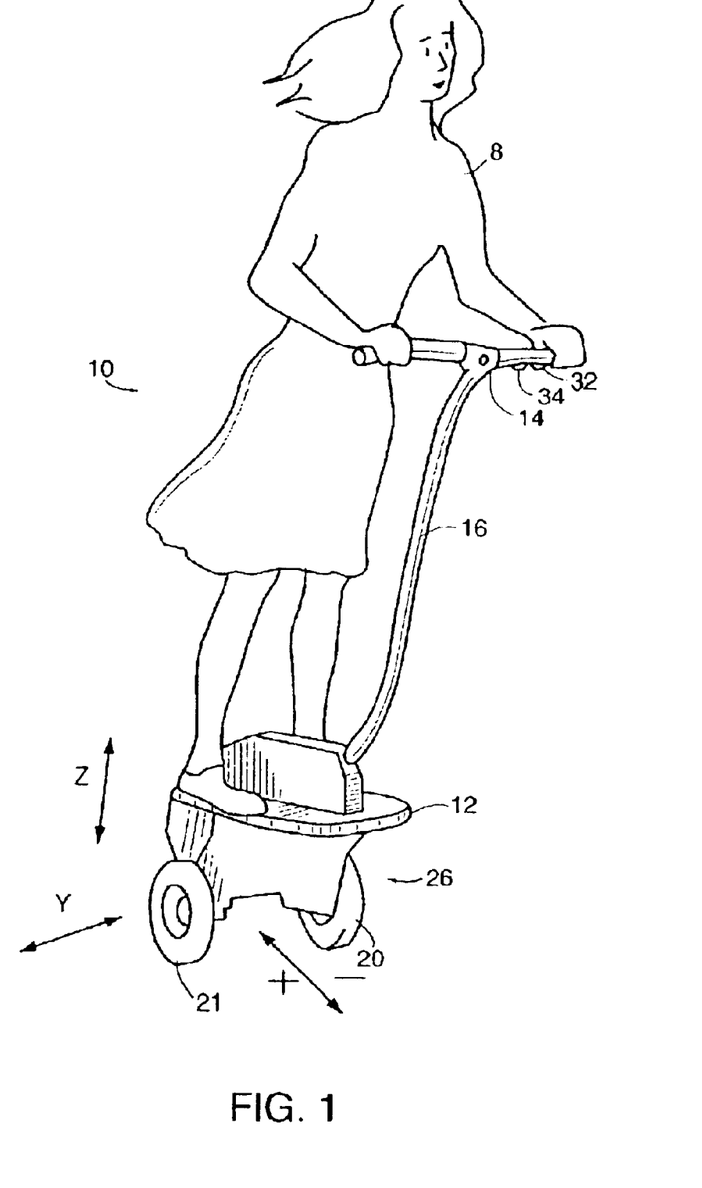
FIG. 1 depicts one embodiment of a human transporter to which the present invention may advantageously be applied.

FIG. 1 shows a transporter, designated generally by numeral 10, of a sort to which the present invention may advantageously be applied. Transporter 10 is described in detail in U.S. Pat. No. 6,302,230, which is incorporated herein by reference in its entirety.

A characteristic of many transporter embodiments to which the present invention may be applied is the use of a pair of laterally disposed ground-contacting members 20 and 21 for suspending a subject 8 over a surface with respect to which the subject is being transported. The ground or other surface, such as a floor, over which a vehicle in accordance with the invention is employed may be referred to generally herein as the "ground." The ground-contacting members 20, 21, here depicted as wheels, are typically motor-driven. In many embodiments, the configuration in which the subject is suspended during locomotion lacks inherent stability in the fore-aft plane at least a portion of the time with respect to a vertical (axis z) but is relatively stable with respect to a vertical in the lateral plane.

Some embodiments of the invention may invoke the concept of primary wheels. The term "primary wheels," as used in this description and in any appended claims, refers to a minimum set of a vehicle's wheels on which the vehicle is capable of operating stably. More generally, the term "primary ground-contacting members" allows for a more general class of members, that includes but is not limited to wheels. Hence, as used in this description and in any appended claims, the term "primary ground-contacting members" refers to a minimum set of a vehicle's ground-contacting members on which the vehicle is capable of operating stably. Other ground-contacting members may include, without limitation: arcuate sections of a wheel, clusters of wheels, treads, etc.

In various embodiments of the invention, fore-aft stability may be achieved by providing a control loop, in which one or more motors are included, for operation of a motorized drive in connection with the ground-contacting members. As described below, a pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain, when the vehicle is not in locomotion, the center of mass of the vehicle above the region of contact of the ground-contacting members with the ground, regardless of disturbances and forces operative on the vehicle.

A ground-contacting member typically has a "point" (actually, a region) of contact or tangency with the surface over which the vehicle is traveling or standing. Due to the compliance of the ground-contacting member, the "point" of contact is actually an area, where the region of contact may also be referred to as a contact patch. The weight of the vehicle is distributed over the contact region, giving rise to a distribution of pressures over the region, with the center of pressure displaced forward during forward motion. The distribution of pressures is a function both of the composition and structure of the wheel, the rotational velocity of the wheel, the torque applied to the wheel, and thus of the frictional forces acting on the wheel.

A force in the direction of motion is required to overcome rolling friction (and other frictional forces, including air resistance). Gravity may be used, in accordance with preferred embodiments of the invention, to provide a torque about the point of contact with the surface in a direction having a component in the sense of desired motion.

Referring further to FIG. 1, user 8 is shown standing on platform (or 'base') 12 of ground-contacting module 26. Wheels 21 and 22 are shown as coaxial about the Y axis. Steering or other control may be provided by one or more thumbwheels 32 and 34, or by other user input mechanisms such as those described in detail in U.S. Pat. No. 6,288,505, herein incorporated by reference. Any user input device that provides the functions discussed below is within the scope of the present invention. Finally, a handlebar 14 is shown as may be provided on stalk 16 for gripping by the user.

Figure 2:
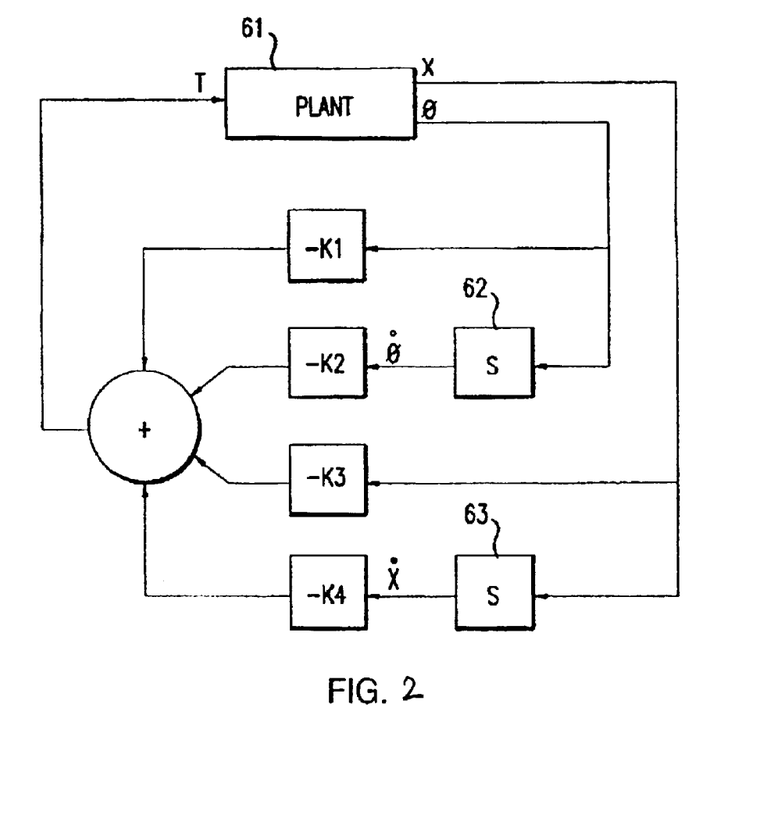
FIG. 2 is a basic block diagram of a controller of a transporter, in accordance with embodiments of the invention.
Figure 3:
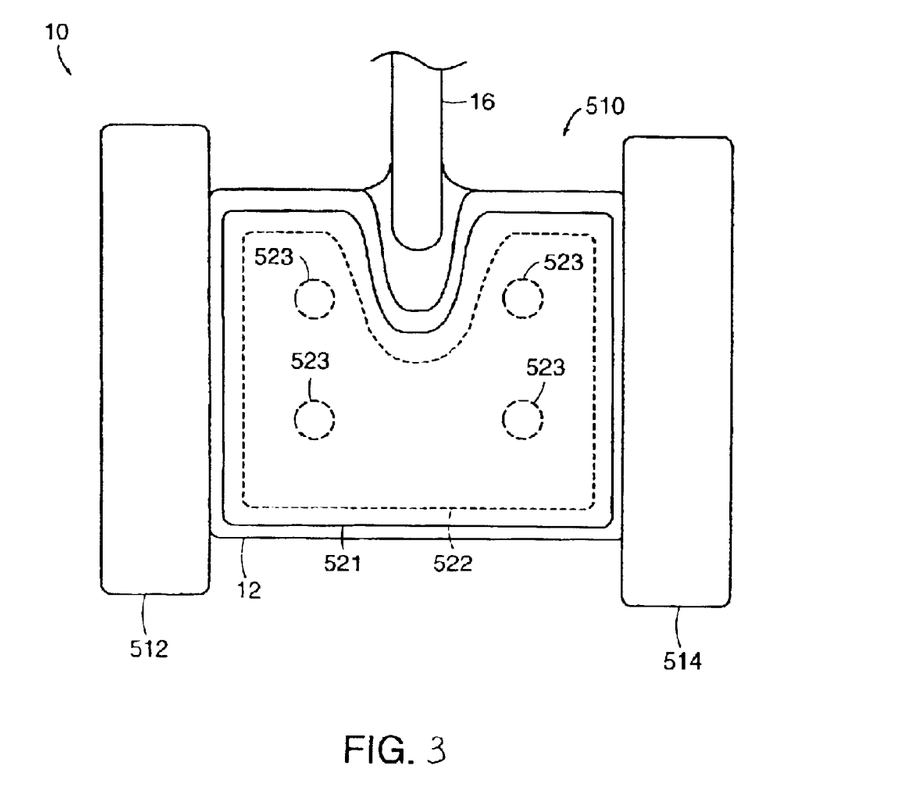
FIG. 3 is a top view of the platform of the transporter of FIG. 1, showing a rider detector in accordance with an embodiment of the invention.

A simplified control algorithm for achieving balance in the embodiment of the invention according to FIG. 1 when the wheels are active for locomotion is shown in the block diagram of FIG. 3. The plant 61 is equivalent to the equations of motion of a system with a ground contacting module driven by a single motor, before the control loop is applied. T identifies the wheel torque. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is governed by the following simplified control equation:

$$T = K_1(\theta - \theta_0) + K_2(\dot{\theta} - \dot{\theta}_0) + K_3(x - x_0) + K_4(\dot{x} - \dot{x}_0), \quad \text{(Eqn. 1)}$$

where:

T denotes a torque applied to a ground-contacting element about its axis of rotation;

$\theta$ is a quantity corresponding to the lean of the entire system about the ground contact, with $\theta_0$ representing the magnitude of a system pitch offset, all as discussed in detail below;

x identifies the fore-aft displacement along the surface relative to a fiducial reference point, with $x_0$ representing the magnitude of a specified fiducial reference offset;

a dot over a character denotes a variable differentiated with respect to time; and a subscripted variable denotes a specified offset that may be input into the system as described below; and $K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the vehicle, as discussed below. The gains $K_1$, $K_2$, $K_3$, and $K_4$ are dependent upon the physical parameters of the system and other effects such as gravity. The simplified control algorithm of FIG. 2 maintains balance and also proximity to the reference point on the surface in the presence of disturbances such as changes to the system's center of mass with respect to the reference point on the surface due to body motion of the subject or contact with other persons or objects. It should be noted that the amplifier control may be configured to control motor current (in which case torque T is commanded, as shown in FIG. 2) or, alternatively, the voltage applied to the motor may be controlled, in which case the commanded parameter is velocity. The effect of $\theta_0$ in the above control equation (Eqn. 1) is to produce a specified offset $\theta_0$ from the non-pitched position where $\theta=0$. Adjustment of $\theta_0$ will adjust the vehicle's offset from a non-pitched position. As discussed in further detail below, in various embodiments, pitch offset may be adjusted by the user, for example, by means of a thumb wheel 32, shown in FIG. 1. An adjustable pitch offset is useful under a variety of circumstances. For example, when operating the vehicle on an incline, it may be desirable for the operator to stand erect with respect to gravity when the vehicle is stationary or moving at a uniform rate. On an upward incline, a forward torque on the wheels is required in order to keep the wheels in place. This requires that the user push the handle further forward, requiring that the user assume an awkward position. Conversely, on a downward incline, the handle must be drawn back in order to remain stationary. Under these circumstances, $\theta_0$ may advantageously be manually offset to allow control with respect to a stationary pitch comfortable to the user.

Alternatively, $\theta_0$ can be set by the control system of the vehicle as a method of limiting the speed and/or the performance of the vehicle.

The magnitude of $K_3$ determines the extent to which the vehicle will seek to return to a given location. With a non-zero $K_3$, the effect of $x_0$ is to produce a specified offset −x₀ from the fiducial reference by which x is measured. When $K_3$ is zero, the vehicle has no bias to return to a given location. The consequence of this is that if the vehicle is caused to lean in a forward direction, the vehicle will move in a forward direction, thereby maintaining balance.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual ground-contacting member is not perfectly rigid, the term "lean" is used herein in the common sense of a theoretical limit of a rigid ground-contacting member. The term "system" refers to all mass caused to move due to motion of the ground-contacting elements with respect to the surface over which the vehicle is moving.

"Stability" as used in this description and in any appended claims refers to the mechanical condition of an operating position with respect to which the system will naturally return if the system is perturbed away from the operating position in any respect.

In order to accommodate two wheels instead of the one-wheel system illustrated for simplicity in FIG. 2, separate motors may be provided for left and right wheels of the vehicle and the torque desired from the left motor and the torque to be applied by the right motor can be governed in the general manner described below in connection with FIG. 4. Additionally, tracking both the left wheel motion and the right wheel motion permits adjustments to be made to prevent unwanted turning of the vehicle and to account for performance variations between the two drive motors.

Operating modes of the transporter may include modes wherein the rider is supported by the transporter but may also include modes where the rider is not supported by the transporter. For example, it may be advantageous for the rider to be able to alight from the transporter platform and to have the transporter stop and keep a station until the user is ready to remount the transporter and assume control of its motion by leaning and steering. A mode in which the transporter maintains stationary balanced operation without a rider may be referred to as an 'electronic kickstand' or 'E-stand' mode.

FIG. 3 shows a rider detection mechanism used in an embodiment of the present invention, as described in detail in U.S. Pat. No. 6,288,505. When the absence of a rider is detected, the transporter is allowed to operate in one or more riderless modes. FIG. 3 shows a top view of the rider detector designated generally by numeral 510. Transporter 10 incorporating the rider detector includes a base 12, left wheel fender 512, right wheel fender 514, support stem 16 for handlebar 14 (shown in FIG. 1). Wheel fenders 512 and 514 cover the corresponding wheels. Support stem 16 is attached to the base 12 and provides a sealed conduit for transmission of signals from controls 32, 34 (shown in FIG. 1) that may be located on the handlebar to the control electronics sealed in the base 12. Wheel fenders 512, 514 are rigidly attached to the sides of the base.

The top of base 12 provides a substantially flat surface and is sized to comfortably support a rider standing on the base 12. A mat 521 covers the top of the base 12 and provides additional protection to the base 12 from particles and dust from the environment. In an alternate embodiment, the mat may also cover part of the fenders 512 514 and may be used to cover a charger port (not shown) that provides for external charging of the power supply. Mat 521 may be made of an elastomeric material that provides sufficient traction such that the rider does not slip off the mat 521 under expected operating conditions. A plate 522 is positioned between base 12 and mat 521. Plate 522 is made of a rigid material and evenly distributes the force acting on the plate 522 from the rider's feet such that at least one rider detection switch 523 is activated when a rider is standing on the mat.

Figure 4A:
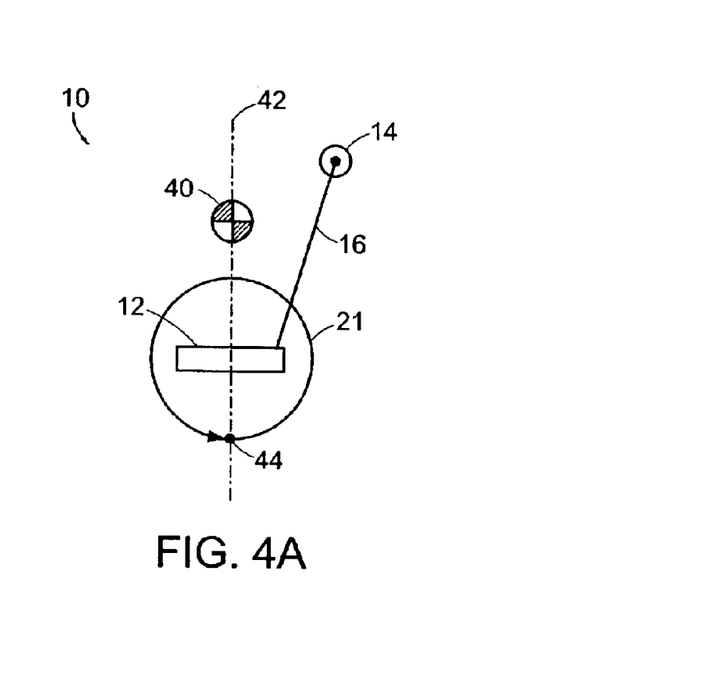
FIGS. 4A and 4B are schematic side views of the balancing transporter of FIG. 1 in two distinct conditions of stasis maintained for differing relative placement of the center of gravity in accordance with an embodiment of the invention.
Figure 4B:
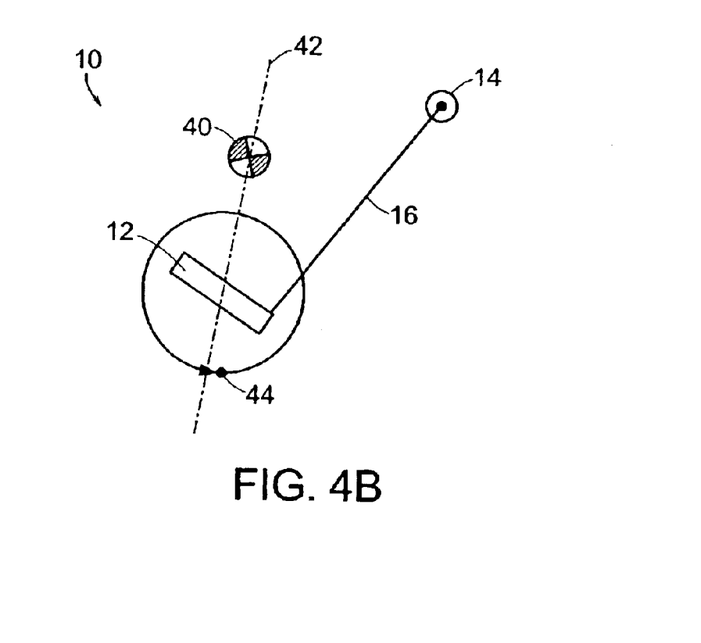

Referring now to FIG. 4A, a schematic sideview is shown of transporter 10, represented by one of its wheels 21, platform 12, handlebar 14, and stalk 16. The center of mass (CM) 40 must lie on a vertical line 42 that passes through the region of contact 44 between wheel 21 and the underlying surface if the transporter is to remain at rest. Otherwise, the pitch of the transporter will cause the wheel to rotate under the transporter to achieve balance, and motion will ensue. The condition in which the transporter is in repose will be referred to herein as 'stasis.' Two conditions of stasis are shown in FIGS. 4A and 4B which differ in that the CM 40 of FIG. 4B lies aft (i.e., to the left on the page) of its position in FIG. 4A. In 'E-stand' mode, if the CM is biased forward, the transporter will pitch backward, and mutatis mutandis, a backward bias of the CM leads to a forward pitch.

Figure 5:
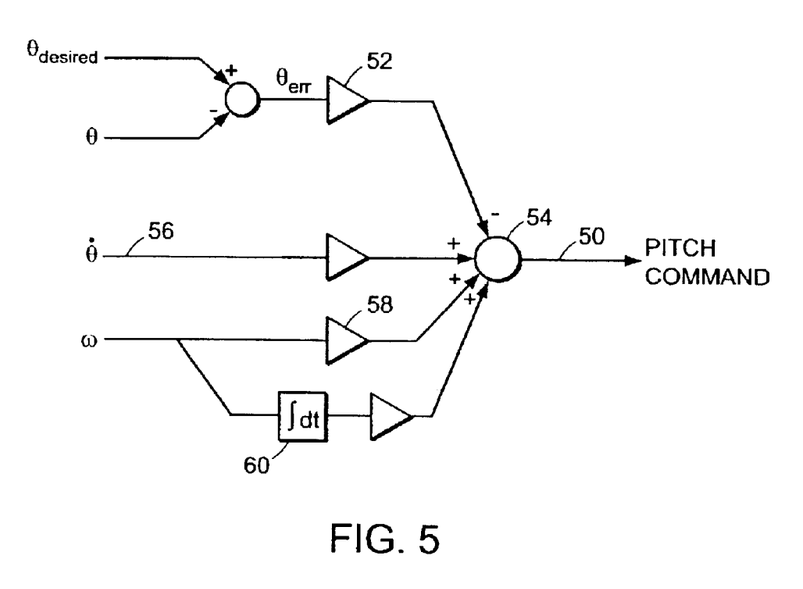
FIG. 5 is a block diagram of an E-stand mode controller in accordance with an embodiment of the invention.

Referring now to FIG. 5, a schematic is shown of a control mode, referred to as 'kickstand mode,' wherein the transporter may stationkeep in a balanced position. FIG. 5 depicts the manner in which a pitch command 50 is derived to be applied to both primary wheel amplifiers. Application of motor commands to govern wheel actuators to drive wheels 20 and 21 is described in U.S. Pat. No. 6,288,505.

First, the difference $\theta_{err}$ between the desired pitch condition $\theta_{desired}$ and the present pitch $\theta$ as determined by an on-board pitch sensor, is subject to gain 52 and supplied to summer 54. Additionally, a signal 56 proportional to a sensed pitch rate $\dot{\theta}$ is supplied to summer 54. State variables $\theta$ and $\dot{\theta}$ may be provided by a sensing system such as, for example, an inertial sensing system as described in U.S. Pat. No. 6,332,103, which is incorporated herein by reference.

The rate $\omega$ of wheel rotation provides another input to summer 54, subject to gain 58, while the wheel rotation is also integrated up by integrator 60 so that the cumulative wheel rotation required to bring the transporter to a pitch state of stasis is maintained. Integrator 60 may be initialized at a given value when the absence of a rider is detected by the rider detection mechanism.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for maintaining stability of a balancing transporter having two laterally disposed wheels, the balancing transporter having a region of contact with an underlying surface and characterized by a center of mass, the method comprising:
   a. detecting the absence of a user aboard a balancing transporter;
   b. determining a desired transporter pitch such as to establish the center of mass directly above the region of contact between the balancing transporter and the underlying surface;
   c. applying a torque to the laterally disposed wheels so as to maintain the transporter at the desired transporter pitch.

2. A method in accordance with claim 1, wherein the step of applying the torque includes applying a torque proportional to the difference between a present transporter pitch and the target transporter pitch.

3. A method in accordance with claim 1, wherein the step of applying the torque includes applying a torque proportional to the sum of coadded terms, a first term proportional to the difference between a present transporter pitch and the target transporter pitch and a second term proportional to the pitch rate of the transporter.

4. A transporter for transporting a load over a surface, the transporter comprising:

a support platform for supporting the load, the support platform characterized by a fore-aft axis, a lateral axis, and an orientation with respect to the surface, the orientation referred to as an attitude;

at least one ground-contacting wheel flexibly coupled to the support platform in such a manner that the attitude of the support platform is capable of variation;

a motorized drive arrangement for driving the at least one ground-contacting wheel;

a sensor module for generating a signal characterizing the attitude of the support platform; and a controller for commanding the motorized drive arrangement based at least on the attitude of the support platform.

* * * * *